May 17, 1949.　　　　D. W. WISHON　　　　2,470,204
RADIATOR TESTING DEVICE
Filed April 3, 1947　　　　　　　　　　　　2 Sheets-Sheet 1

Inventor
Dewey W. Wishon

By Clarence A. O'Brien
and Harvey B. Jacobson
Attorneys

May 17, 1949.    D. W. WISHON    2,470,204
RADIATOR TESTING DEVICE
Filed April 3, 1947    2 Sheets-Sheet 2

Inventor
Dewey W. Wishon

By Clarence A. O'Brien
and Harvey B. Jackson
Attorneys

Patented May 17, 1949

2,470,204

UNITED STATES PATENT OFFICE 2,470,204

RADIATOR TESTING DEVICE

Dewey W. Wishon, Oak Ridge, Tenn.

Application April 3, 1947, Serial No. 739,202

1 Claim. (Cl. 73—51)

This invention relates to new and useful improvements and structural refinements in radiator testing devices, and the principal object of the invention is to provide a device of the character herein described, such as may be conveniently and effectively employed as a combined work bench and an air pressure testing apparatus for automobile radiators, or the like.

A further object of the invention is to provide a testing device which is power operated, so as to substantially minimize the expenditure of effort on the part of the person using the same.

Another object of the invention is to provide a radiator testing device which is simple in construction, convenient in operation, and which will readily accommodate radiators of various sizes and types.

An additional object of the invention is to provide a radiator testing device which will readily lend itself to economical manufacture and which is otherwise well adapted for the purpose for which it is intended.

With the above more important objects in view and such other objects as may become apparent as this specification proceeds, the invention consists essentially of the construction and arrangement of parts as shown in the accompanying drawings in which.

Like characters of reference are used to designate like parts in the specification and throughout the several views.

Figure 1:
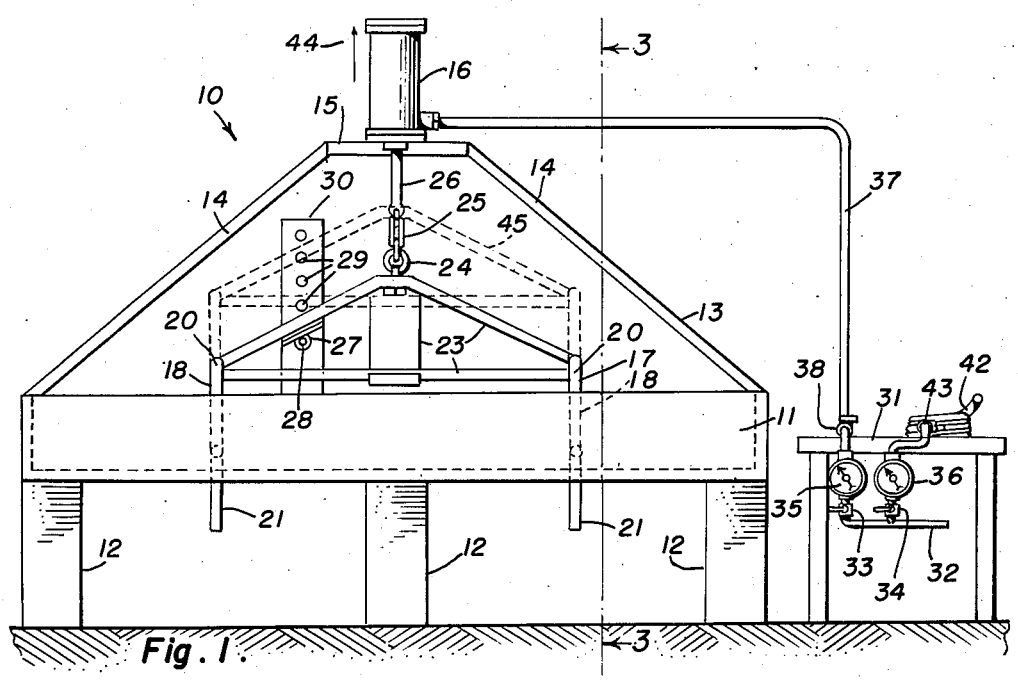
Figure 1 is a front elevational view of the invention.
Figure 2:
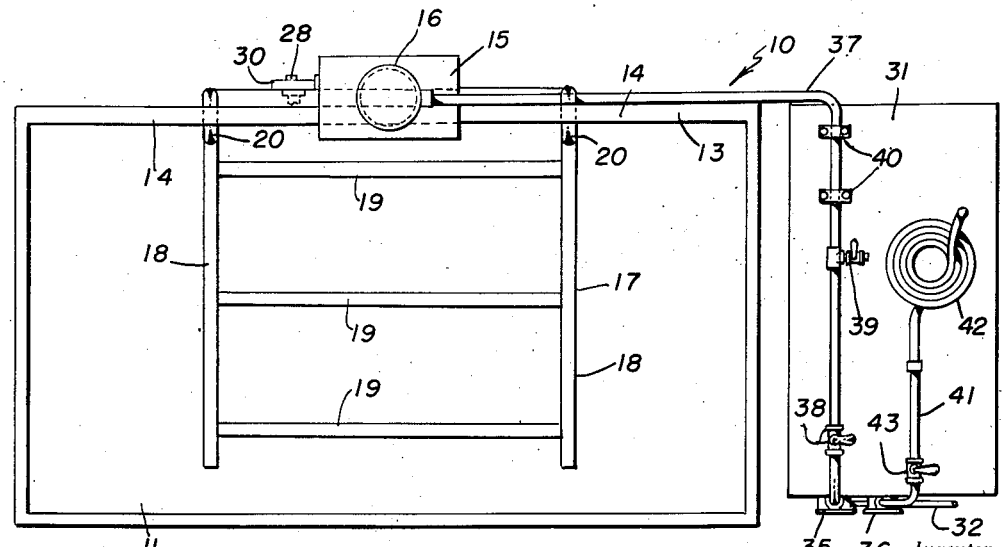
Fig. 2 is a top plan view thereof.

Referring now to the accompanying drawings in detail, the invention consists of a radiator testing device designated generally by the reference character 10, the same embodying in its construction a suitable water tank 11 supported in an elevated position by means of a plurality of legs 12.

An upstanding frame 13 is provided at the rear edge of the tank 11, the frame 13 consisting of a pair of upwardly convergent members 14 connected together at the upper extremities thereof by means of a cross member or plate 15. This cross member, in turn, supports a vertically disposed, pneumatic lift cylinder 16, which will be hereinafter more fully described.

A suitable rack 17, consisting of a pair of spaced parallel side members 18 connected together by a plurality of cross members 19 is immersible in the tank 11, but may be elevated therefrom in a manner presently to be described.

The rear end portions of the side members 18 assume an inverted, substantially U-shaped configuration as indicated at 20 and the free end portions 21 thereof are slidable in a pair of vertical guides 22 provided at the rear edge of the tank 11.

The portions 20 of the rack 17 are reinforced by means of a substantially triangular head member 23, the apex of which is provided with an eye 24. This eye is adjustably connected by means of a length of chain 25 to the piston rod 26 of the aforementioned cylinder 16, as will be clearly apparent.

It will be also noted that the head member 23 is provided with a bracket 27 which, in turn, carries a locking bolt 28. This bolt is selectively receivable in a row of apertures 29 formed in an upstanding bar or plate 30 secured to the tank 11. The purpose of the parts 28 and 30 will be hereinafter more fully explained.

A control bench 31 is positioned adjacent the tank 11 and a compressed air line 32 is led to the bench, as will be clearly apparent.

The air line 32 is provided with a pair of independent, air pressure regulating valves 33, 34, each of which, in turn, communicates with an air pressure gauge, namely, the gauges 35 and 36 respectively. The gauge 35 is connected by means of an air line 37 to the aforementioned cylinder 16 and the air line 37 is provided with a shut-off valve 38 and with a release valve 39, the latter being disposed between the valve 38 and the cylinder. If desired, suitable clamps 40 may be employed for securing the line 37 to the bench or table 31.

The aforementioned gauge 36 is connected by means of a length of pipe 41 to a flexible testing tube 42, and a shut-off valve 43 is provided on the pipe 41, as will be clearly understood.

Having thus described the structure of the invention, its method of operation will now be explained.

Figure 3:
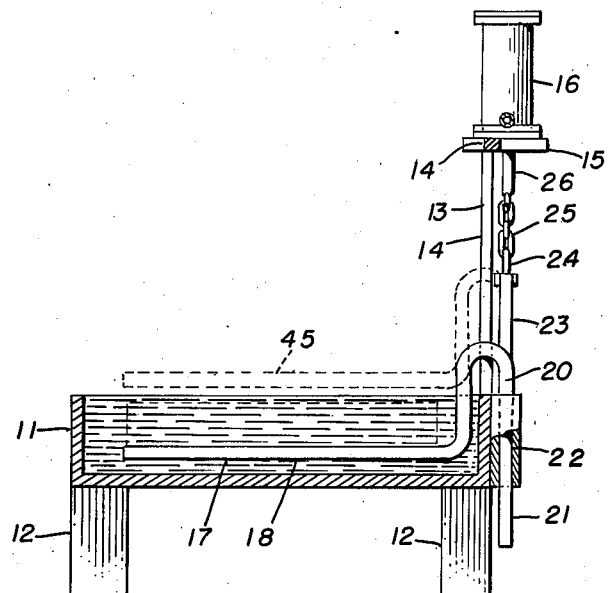
Figure 3 is a cross sectional view, taken substantially in the plane of the line 3—3 of Figure 1.
Figure 4:
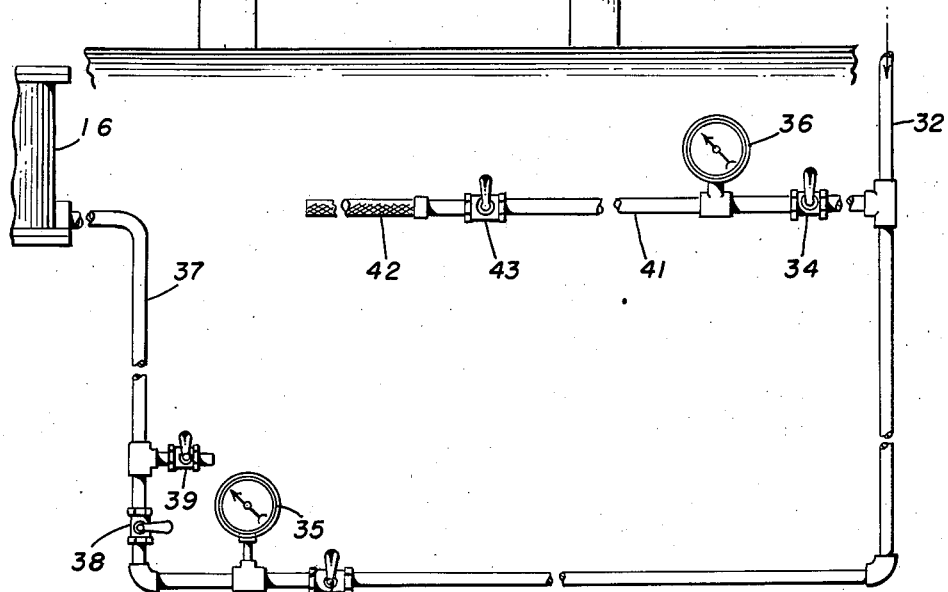
Figure 4 is a diagrammatic illustration of the air line connection used in the invention.

Assuming the rack 17 to be immersed in the tank 11 as shown in Figure 3, the rack may be lifted from the tank by simply opening the valve 38 and closing the valve 39, so as to permit the cylinder 16 to be actuated by compressed air flowing through the line 32. Matters are so arranged that under such circumstances, the piston rod 26 will be forced in the direction of the arrow 44, and as a result, the rack 17 will be lifted from the tank, substantially to a position indicated by the phantom line 45.

The radiator may then be placed on the rack 17 and the flexible hose 42 may be connected to the radiator, whereupon, by simply opening the valve 39 and closing the valve 38, air will be permitted to discharge from the cylinder 16, so that the rack 17, together with the radiator will be immersed in the tank 11.

The valve 43 should then be opened so as to facilitate testing of the submerged radiator by means of air pressure, as will be clearly apparent.

When the testing operation has been completed, the cylinder 16 may again be actuated so as to elevate the rack from the tank, and it will be found that the rack, in its elevated position, will function as an effective work bench while repairs of the radiator are being undertaken.

The valves 33, 34 are employed, of course, for the reduction of air pressure to be used in actuating the cylinder 16, and also, in the testing of the radiator by means of the hose 42.

The chain 25 provides a longitudinal adjustment in the connection between the piston rod 26 and the rack 17, that is, by shortening or lengthening the chain, the relative position of the rack with respect to the piston rod may be correspondingly altered. Furthermore, by selectively engaging the bolt 28 with the apertures 29, the rack 17 may be releasably locked in a predetermined position while repairs of the radiator are being undertaken, so that it is not necessary to maintain pressure in the cylinder 16.

It is believed that the advantages and use of the invention will be clearly understood from the foregoing disclosure and accordingly, further description thereof at this point is considered unnecessary.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

In a radiator testing device, the combination of a water tank supported in an elevated position, an upstanding frame provided at one edge of said tank, a set of vertical guides provided on said tank under said frame, a forwardly extending rack slidable in said guides and immersible in said tank, a pneumatic lift cylinder including a vertically reciprocable piston rod mounted on said frame, a connecting element secured to said piston rod and to said rack, an upright bar provided on said tank and formed with a vertical row of apertures, a locking bolt provided on said rack and receivable selectively in said apertures, a compressed air line connected to said cylinder, a radiator testing tube connected to said air line, and means for independently controlling air pressure in said cylinder and in said tube.

DEWEY W. WISHON.

REFERENCES CITED

The following references are of record in the file of this patent:

UNITED STATES PATENTS

| Number | Name | Date |
| --- | --- | --- |
| 1,551,490 | Keily | Aug. 25, 1925 |
| 1,712,874 | Cross | May 14, 1929 |
| 1,778,563 | Peck | Oct. 14, 1930 |
| 2,159,063 | Walker | May 23, 1939 |

FOREIGN PATENTS

| Number | Country | Date |
| --- | --- | --- |
| 12,049 | Great Britain | Sept. 21, 1911 |